United States Patent
Kinoshita et al.

(10) Patent No.: US 8,280,629 B2
(45) Date of Patent: Oct. 2, 2012

(54) NAVIGATION DEVICE, DATA UPDATING METHOD AND PROGRAM

(75) Inventors: Hirofumi Kinoshita, Utsunomiya (JP); Keisuke Kondo, Sakura (JP); Toru Murayama, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 237 days.

(21) Appl. No.: 12/741,513

(22) PCT Filed: Oct. 29, 2008

(86) PCT No.: PCT/JP2008/069690
§ 371 (c)(1),
(2), (4) Date: May 5, 2010

(87) PCT Pub. No.: WO2009/060771
PCT Pub. Date: May 14, 2009

(65) Prior Publication Data
US 2010/0250121 A1 Sep. 30, 2010

(30) Foreign Application Priority Data
Nov. 8, 2007 (JP) ................................. 2007-290909

(51) Int. Cl.
*G01C 21/10* (2006.01)
(52) U.S. Cl. .......................... 701/450; 701/400; 701/409
(58) Field of Classification Search .................. 701/400, 701/409, 450
See application file for complete search history.

(56) References Cited

U.S. PATENT DOCUMENTS

| | | | |
|---|---|---|---|
| 2006/0190166 A1 | 8/2006 | Ohira et al. | |
| 2007/0244636 A1* | 10/2007 | Horikami | 701/208 |
| 2007/0282524 A1* | 12/2007 | Tanizaki et al. | 701/208 |
| 2008/0033639 A1* | 2/2008 | Nakamura et al. | 701/208 |
| 2009/0228194 A1* | 9/2009 | Imasaka et al. | 701/200 |
| 2010/0042651 A1* | 2/2010 | Nakamura et al. | 707/104.1 |
| 2010/0241344 A1* | 9/2010 | Nagase et al. | 701/118 |

FOREIGN PATENT DOCUMENTS

| | | |
|---|---|---|
| EP | 1736950 A1 | 12/2006 |
| JP | 2004-053408 | 2/2004 |
| JP | 2006-047444 | 2/2006 |
| JP | 2006-220524 | 8/2006 |

(Continued)

*Primary Examiner* — Hussein El Chanti
(74) *Attorney, Agent, or Firm* — Rankin, Hill & Clark LLP

(57) ABSTRACT

A navigation device that is mounted in a movable body of the present invention includes a first storing portion that stores a first navigation data; an acquiring portion that acquires a second navigation data from an external second storing portion; a movable body location detecting portion that detects the location of the movable body; a navigation operation executing portion that executes a predetermined navigation operation based on the location of the movable body that is detected by the movable body location detecting portion, and the first navigation data; and an updating portion that updates the first navigation data with the second navigation data. The updating portion stops the execution of the navigation operation by the navigation operation executing portion, and executes a first updating process that updates a portion of the first navigation data corresponding to a first area that includes the vicinity of the location of the movable body; and a second updating process that updates a portion corresponding to a second area of the first navigation data other than the first area in parallel with the navigation operation by the navigation operation executing portion, after this first updating process is completed.

13 Claims, 16 Drawing Sheets

FOREIGN PATENT DOCUMENTS

| | | |
|---|---|---|
| JP | 2006-251768 | 9/2006 |
| JP | 2007-065042 | 3/2007 |
| WO | 2005/116959 | 12/2005 |
| WO | 2006/126360 | 11/2006 |
| WO | 2007/023897 | 3/2007 |

\* cited by examiner dNV< dAZ< dUT< dCO< dNM< dID< dOR< · · ·

CA⇒NV⇒AZ⇒UT⇒CO⇒NM⇒ID⇒OR · · ·

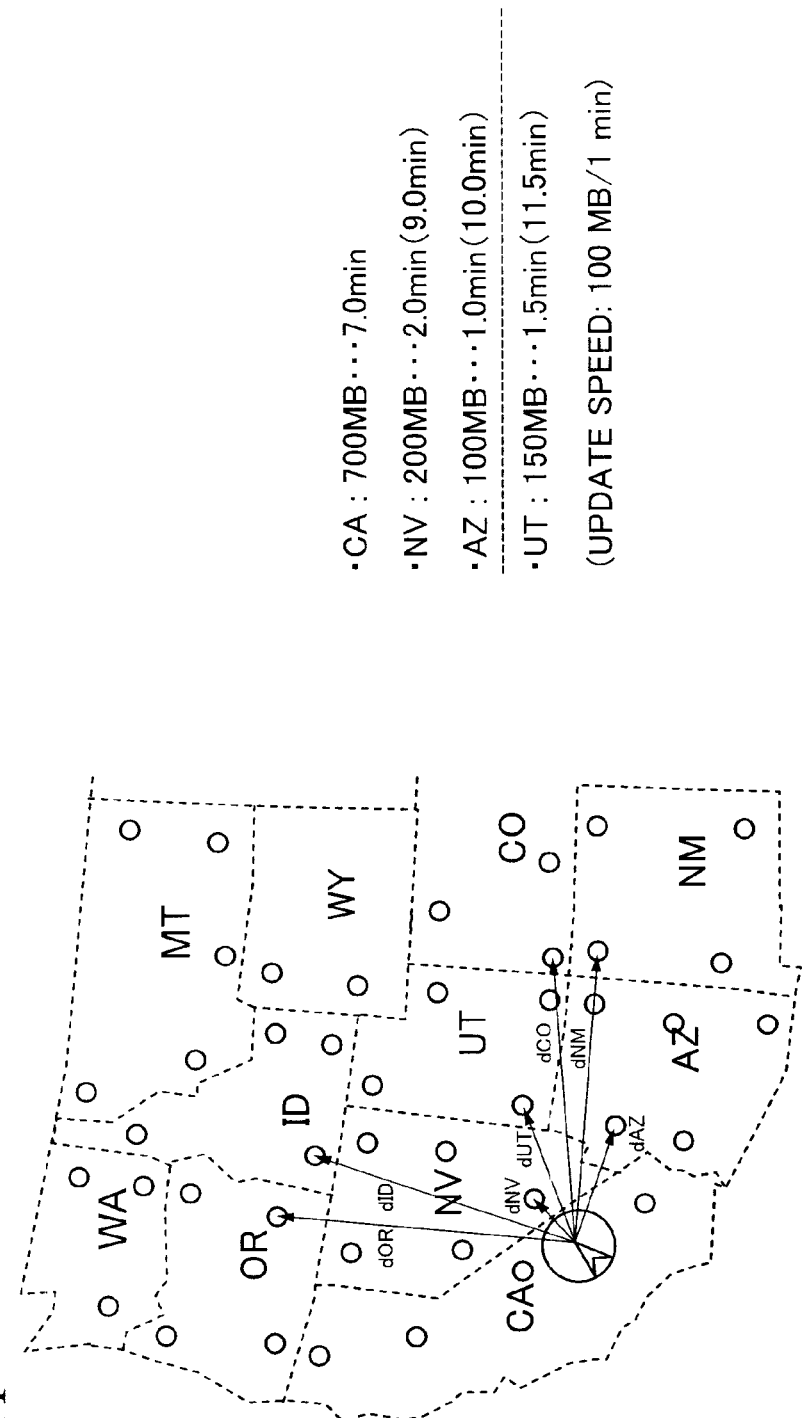

T5:(T5−T4)≧THRESHOLD VALUE (5 minutes)

T5:(T5−T4)<THRESHOLD VALUE (5 minutes)

NAVIGATION DEVICE, DATA UPDATING METHOD AND PROGRAM

TECHNICAL FIELD

The present invention relates to a navigation device, a data updating method and program.

Priority is claimed on Japanese Patent Application No. 2007-290909, filed Nov. 8, 2007, the content of which is incorporated herein by reference.

BACKGROUND ART

Conventionally, when for example updating navigation data that is stored on a hard disk that is provided in a navigation device that is mounted in a vehicle, there is known a method that involves removing the hard disk from the navigation device and installing a hard disk in which new navigation data is stored in the navigation device (for example, refer to Patent Document 1).

[Patent Document 1] Japanese Unexamined Patent Application Publication No. 2004-53408

DISCLOSURE OF THE INVENTION

Problems that the Invention is to Solve

In the method according to the example of the aforementioned prior art, the problems arise of requiring the troublesome effort of removing the hard disk in which the navigation data is stored from the navigation device, and the time during which the navigation device is unusable becoming excessively long.

In the case of entrusting the operation of removing the hard disk from the navigation device to, for example, a dedicated facility such as a vehicle shop, the problems arise of the time and labor required for moving the vehicle to the dedicated facility accumulating, and furthermore the time required until completion of the updating of the navigation data becoming excessively long.

The present invention was achieved in view of the above circumstances, and has its object to provide a navigation device, a data updating method and program that can shorten the time required for updating of navigation data while ensuring a desired navigation operation.

Means of Solving the Problems

In order to achieve the object of solving the aforementioned issues, a navigation device of a first embodiment of the present invention is provided with a first storing portion that stores a first navigation data; an acquiring portion that acquires a second navigation data from an external second storing portion; a movable body location detecting portion that detects the location of the movable body; a navigation operation executing portion that executes a predetermined navigation operation based on the location of the movable body that is detected by the movable body location detecting portion, and the first navigation data that is stored in the first storing portion; and an updating portion that updates the first navigation data that is stored in the first storing portion with the second navigation data; the updating portion stopping the execution of the navigation operation by the navigation operation executing portion and executing a first updating process that updates a portion of the first navigation data corresponding to a first area that includes the vicinity of the location of the movable body that is detected by the movable body location detecting portion; and a second updating process that updates a portion corresponding to a second area of the first navigation data other than the first area in parallel with the navigation operation by the navigation operation executing portion, after this first updating process is completed.

In a navigation device according to a second embodiment of the present invention, the first navigation data that is stored in the first storing portion and the second navigation data that is stored in the second storing portion are respectively divided into a plurality of areas; and the updating portion performs the first updating process with the area to which the location of the movable body that is detected by the movable body location detecting portion belongs serving as the first area, among the areas of the first and second navigation data.

In a navigation device according to a third embodiment of the present invention, the first navigation data that is stored in the first storing portion and the second navigation data that is stored in the second storing portion are respectively divided into a plurality of areas; and the updating portion performs the first updating process with the area to which the location of the movable body that is detected by the movable body location detecting portion belongs and an area that is adjacent to this area serving as the first area, among the areas of the first and second navigation data.

In a navigation device according to a fourth embodiment of the present invention, the first navigation data that is stored in the first storing portion and the second navigation data that is stored in the second storing portion are respectively divided into a plurality of areas, and provided with a representative point that is set in advance in each area; each area is arranged in an order of shortness of the distance between the location of the movable body that is detected by the movable body location detecting portion and the representative point; and the updating portion selects the area to which the location of the movable body that is detected by the movable body location detecting portion belongs and an area from the areas that can be updated within a predetermined time according to the order, and performs the first updating process with the selected areas serving as the first area.

A navigation device according to a fifth embodiment of the present invention, further provided with a time setting portion that sets the predetermined time in accordance with an input operation of the operator.

A navigation device according to a sixth embodiment of the present invention is further provided with an area selecting portion that selects an arbitrary area corresponding to an input operation of the operator; and a reporting portion that reports the time required for executing the first updating process by the updating portion; the first navigation data that is stored in the first storing portion and the second navigation data that is stored in the second storing portion being respectively divided into a plurality of areas; the arbitrary area being selected from the areas; the reporting portion reporting the updating time at each timing in which the arbitrary area is selected by the area selecting portion; and the updating portion performing the first updating process with the area to which the location of the movable body that is detected by the movable body location detecting portion belongs and the arbitrary area that is selected by the area selecting portion serving as the first area.

In a navigation device according to a seventh embodiment of the present invention, the first navigation data that is stored in the first storing portion and the second navigation data that is stored in the second storing portion are respectively divided into a plurality of areas, and provided with a representative point that is set in advance in each area; each area is arranged in an order of shortness of the distance between the location of the movable body that is detected by the movable body location detecting portion and the representative point; and the updating portion performs the second updating process with each area in turn according to the arrangement serving as the second area.

A navigation device according to an eighth embodiment of the present invention is further provided with a guide route setting portion that sets a guide route of the movable body; the first navigation data that is stored in the first storing portion and the second navigation data that is stored in the second storing portion being respectively divided into a plurality of areas; each area being arranged according to the guide route that is set by the guide route setting portion; and the updating portion performing the second updating process with each area in turn according to the arrangement serving as the second area.

In a navigation device according to a ninth embodiment of the present invention, the updating portion is provided with a switching portion that is capable of switching between the execution of the first updating process and the execution of the second updating process.

In the navigation device according to a tenth embodiment of the present invention, the updating portion is provided with a selecting and executing portion that selects and executes the first updating process or the second updating process.

The navigation device according to an eleventh embodiment of the present invention is further provided with a location reporting portion that, in the execution of either the first updating process and the second updating process by the updating portion, reports whether the location of the movable body that is detected by the movable body location detecting portion belongs to an area of the first navigation data that is stored in the first storing portion, or an area of the second navigation data that is stored in the second storing portion.

A data updating method according to a twelfth embodiment of the present invention is a navigation data updating method of a navigation device that is mounted in a movable body that updates a first navigation data that is stored in a first storing portion to a second navigation data that is stored in an external second storing portion, characterized by stopping the execution of a predetermined navigation operation based on the location of the movable body and the first navigation data that is stored in the first storing portion; and executing at least any of a first updating process that updates a portion of the first navigation data corresponding to a first area that includes the vicinity of the location of the movable body; and a second updating process that updates a portion corresponding to a second area that is an area other than the first area in parallel with the execution of the navigation operation, after this first updating process is completed.

A program according to a thirteenth embodiment of the present invention is a program for causing a computer of a navigation device that is mounted in a movable body to update a first navigation data that is stored in a first storing portion to a second navigation data that is stored in an external second storing portion, provided with a movable body location detecting portion that detects the location of the movable body; a navigation operation executing portion that executes a predetermined navigation operation based on the location of the movable body that is detected by the movable body location detecting portion, and the first navigation data that is stored in the first storing portion; an acquiring portion that acquires the first navigation data from the second storage portion; and an updating portion that updates the first navigation data that is stored in the first storing portion with the second navigation data; and the updating portion stopping the execution of a predetermined navigation operation based on the location of the movable body and the first navigation data that is stored in the first storing portion; and executing at least any of a first updating process that updates a portion of the first navigation data corresponding to a first area that includes the vicinity of the location of the movable body; and a second updating process that updates a portion corresponding to a second area that is an area other than the first area in parallel with the execution of the navigation operation, after this first updating process is completed.

Effects of the Invention

According to the navigation device of the first embodiment of the invention, during updating of navigation data that is stored in a first storage portion that is provided in the navigation device of a movable body, the period during which execution of the navigation operation is stopped is only the period required for updating of the navigation data of a first area that includes the vicinity of the current location of the vehicle (that is, the navigation data in which the priority of update is relatively high. Thereby, compared to the case of updating navigation data of an area that covers an excessively broad area for example, it is possible to shorten the period during which execution of the navigation operation is stopped.

According to the navigation device of the second embodiment of the invention, it is possible to suitably set a first area corresponding to the navigation data that is updated by the first updating process in which the execution stop of the navigation operation is required.

According to the navigation device of the third embodiment of the invention, even for example if the location of the movable body is near a border of an area, it is possible to suitably set a first area corresponding to the navigation data that is updated by the first updating process in which the execution stop of the navigation operation is required.

According to the navigation device of the fourth embodiment of the invention, in addition to the area to which the location of the mobile body belongs, areas that are selected in order of the shortness of the distance between the location of the mobile body and the representative point of each area among the plurality of other areas, and in which the time required for execution completion of the first updating process is within a predetermined time are made a first area. Thereby, it is possible to suitably update the navigation data even in the case of for example there being the possibility of the mobile body crossing a border of the area.

According to the navigation device of the fifth embodiment of the invention, it is possible to accurately reflect the will of the operator in the time that is required for execution completion of the full power update, and it is possible to improve convenience.

According to the navigation device of the sixth embodiment of the invention, it is possible to accurately reflect the will of the operator in the setting of the first area that corresponds to the navigation data that is updated by the first updating process in which the execution stop of the navigation operation is required.

According to the navigation device of the seventh embodiment of the invention, because a second updating process is performed in turn with the areas that are selected in order of shortness of the distance between the location of the movable body and the representative point of each area serving as the second area, in the second updating process it is possible to perform an update in the order from the navigation data in which the priority of update is relatively high.

According to the navigation device of the eighth embodiment of the invention, the second updating process is performed with the areas that are arranged according to the guide route serving as the second area in turn. Thereby, in the second updating process, it is possible to perform an update in the order from the navigation data in which the priority of update is relatively high.

According to the navigation device of the ninth embodiment of the invention, it is possible to switch between the execution state of the first updating process and the execution state of the second updating process. Thereby, it is possible to flexibly control the updating operation of the navigation data.

According to the navigation device of the tenth embodiment of the invention, it is possible to select and execute the first updating process or the second updating process. Thereby, it is possible to flexibly control the updating operation of the navigation data.

According to the navigation device of the eleventh embodiment of the invention, it is possible to make the operator accurately grasp the location of the mobile body and the updating state of the navigation data.

According to the data updating method according to twelfth embodiment of the present invention, during updating of navigation data that is stored in a first storage portion that is provided in the navigation device of a movable body, the period during which execution of the navigation operation is stopped is only the period required for updating of the navigation data of a first area that includes the vicinity of the current location of the vehicle (that is, the navigation data in which the priority of update is relatively high. Thereby, compared to the case of updating navigation data of an area that covers an excessively broad area for example, it is possible to shorten the period during which execution of the navigation operation is stopped.

According to the program of the thirteenth embodiment of the present invention, during updating of navigation data that is stored in a first storage portion that is provided in the navigation device of a movable body, the period during which execution of the navigation operation is stopped is only the period required for updating of the navigation data of a first area that includes the vicinity of the current location of the vehicle (that is, the navigation data in which the priority of update is relatively high. Thereby, compared to the case of updating navigation data of an area that covers an excessively broad area for example, it is possible to shorten the period during which execution of the navigation operation is stopped.

BRIEF DESCRIPTION OF THE DRAWINGS

FIG. 11 is a drawing that shows an example of representative points that are set in advance in each area (administrative district) in navigation data according to one embodiment of the present invention.

DESCRIPTION OF REFERENCE NUMERALS

10 NAVIGATION DEVICE
11 CURRENT LOCATION DETECTING PORTION (MOVABLE BODY LOCATION DETECTING PORTION)
12 NAVIGATION DATA STORAGE PORTION (FIRST STORING PORTION)
13 NAVIGATION DATA ACQUIRING PORTION
16 OUTPUT PORTION (REPORTING PORTION)
42 NAVIGATION PROCESSING PORTION (NAVIGATION OPERATION EXECUTING PORTION, GUIDE ROUTE SETTING PORTION)

43 OUTPUT CONTROL PORTION
44 UPDATE PROCESSING PORTION (UPDATING PORTION, AREA SELECTING PORTION, REPORTING PORTION)
46 TIME SETTING PORTION (TIME SETTING PORTION)
S03 SELECTING AND EXECUTING PORTION
S04 SELECTING AND EXECUTING PORTION
S14 SWITCHING PORTION
S18 LOCATION REPORTING PORTION
S20 SWITCHING PORTION

BEST MODE FOR CARRYING OUT THE INVENTION

Hereinbelow, an embodiment of the navigation device, data updating method and program of the present invention shall be described with reference to the drawings.

Figure 1:
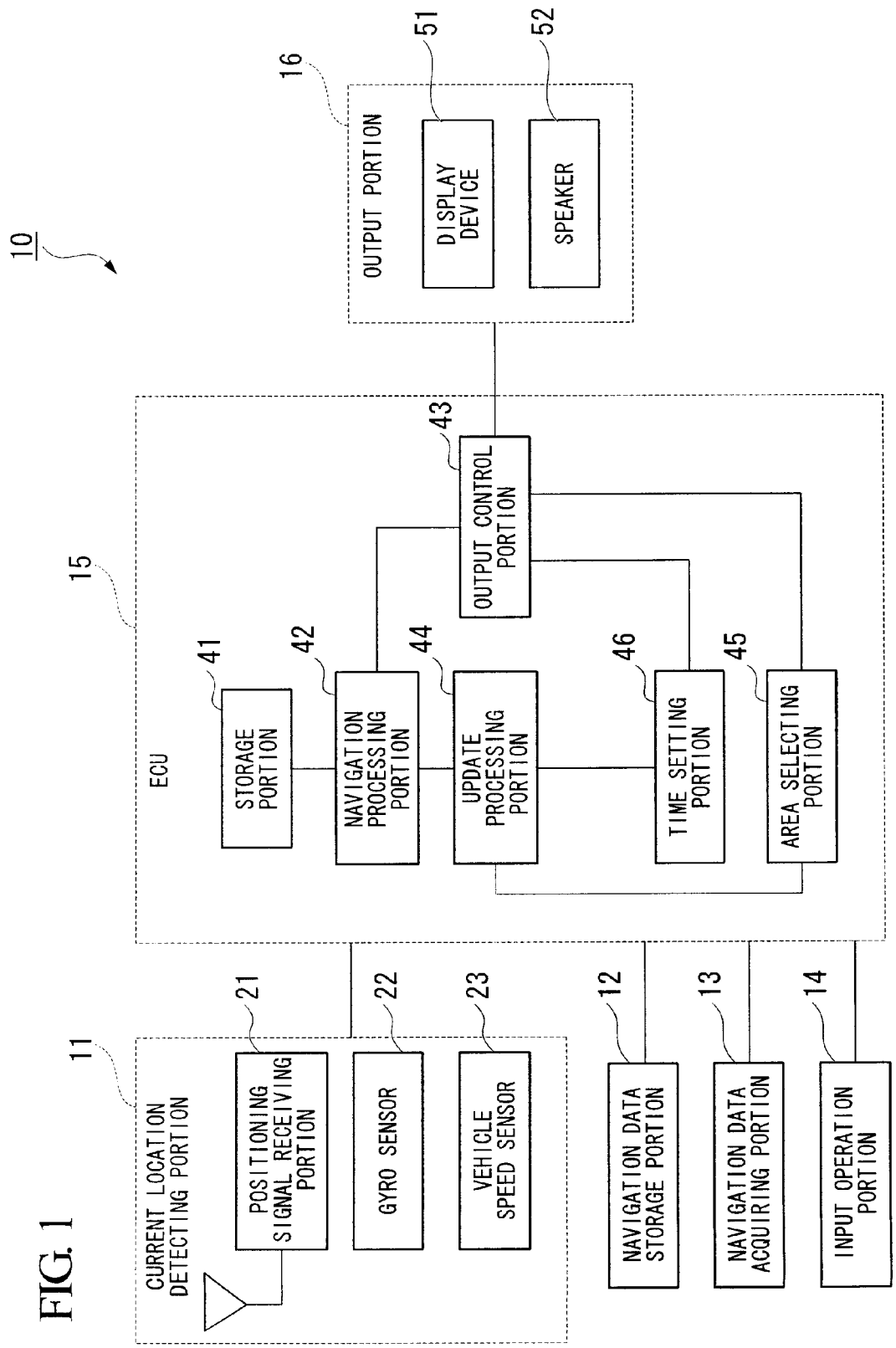
FIG. 1 is a schematic drawing of the navigation device according to one embodiment of the present invention.

A navigation device 10 according to the present embodiment is for example mounted in a vehicle, and as shown in FIG. 1, is constituted by a current location detecting portion 11, a navigation data storage portion 12, a navigation data acquiring portion 13, an input operation portion 14, an ECU 15, and an output portion 16.

The current location detecting portion 11 is constituted by a positioning signal receiving portion 21, a gyro sensor 22, and a vehicle speed sensor 23. The positioning signal receiving portion 21 receives positioning signals such as GPS (Global Positioning System) signals for measuring the location of a vehicle using artificial satellites or the like, or signals such as D (Differential) GPS signals for improving the positioning accuracy by correcting errors in the GPS signal using an appropriate base station, for example. The gyro sensor 22 detects the orientation of the self vehicle on the horizontal plane, an inclination angle thereof (e.g., an inclination angle of the fore-aft direction axis of the vehicle with respect to a vertical direction, or a yaw angle which is the angle of rotation of the vehicle's center of gravity about the vertical direction), and changes in the inclination angle (for example, yaw rate). The vehicle speed sensor 23 detects the speed of the vehicle (vehicle speed). The current location of the vehicle is calculated based on the received positioning signals or by way of calculation processing for autonomous navigation based on detected signals such as vehicle speeds and yaw rate.

The navigation data storage portion 12 stores as navigation data map data for displaying maps on for example a display screen 51*a* of a display device 51 of the output portion 16, road data that consists of information such as the connection status and shapes of roads, search data that is referred to when searching for example various facilities and urban areas, voice recognition data that is referred to for example during voice recognition processing, audio data that is output from the output portion 16 by an operation such as voice guidance, for example, and various application programs.

The map data is constituted by data of for example contour map data, polygon data that corresponds to for example various facilities, city blocks, lakes and the like, text data such as facility names and place names correlated to each polygon, and various symbol type data.

The road data is constituted by for example data such as nodes (that is, coordinate points for grasping the shapes of roads), links that are lines connecting respective nodes, distances between links, and road types, widths, interportion angles and shapes.

Figure 9A:
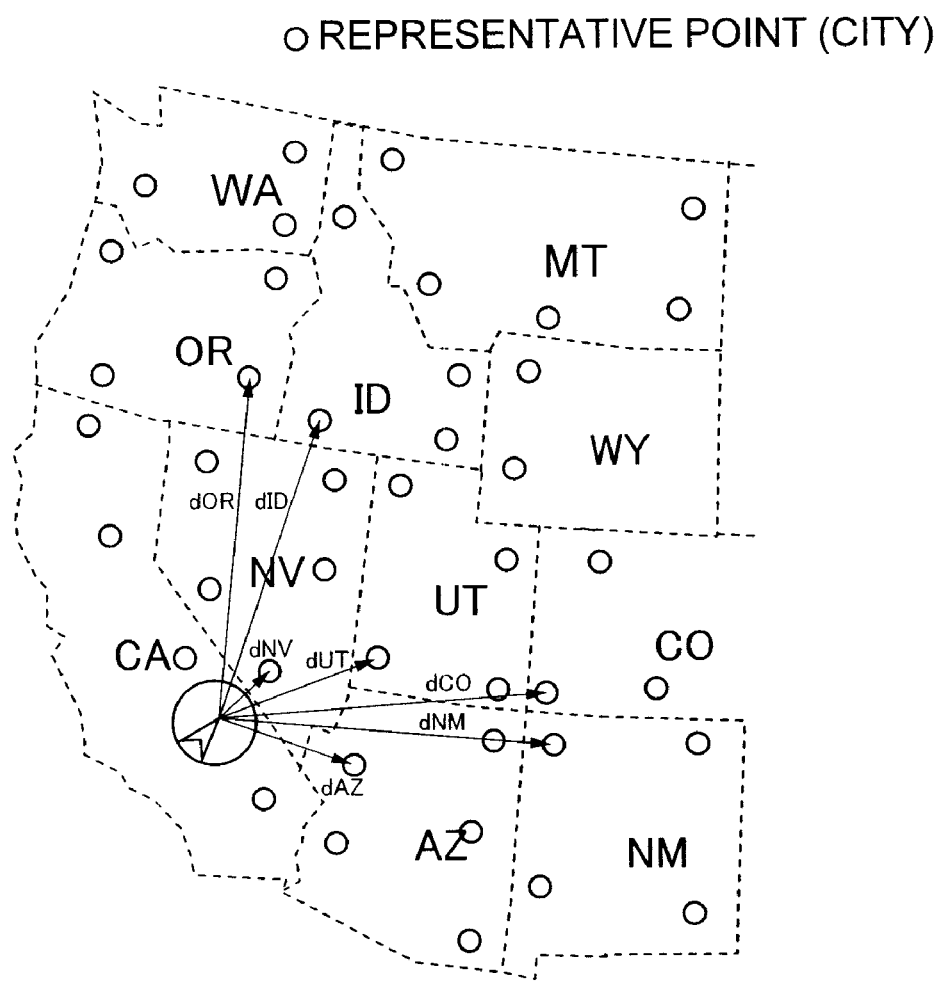
FIG. 9A is a drawing that shows an example of representative points that are set in advance in each area (administrative district) in navigation data according to one embodiment of the present invention.

The navigation data, as shown in FIG. 9A, B and FIG. 11 described below, is constituted for example from a plurality of data that are divided into predetermined administrative districts, and provided with a predetermined position that is set in advance in each administrative district as a representative point of each administrative district. In the present embodiment, the navigation data is divided into administrative districts, but it is not limited thereto.

The navigation data acquiring portion 13 is provided with a reading device (not illustrated) that reads new navigation data from a portable storage medium (not illustrated) such as a DVD or memory card on which new navigation data is stored in order to update the navigation data that is housed in the navigation data storage portion 12, and outputs the new navigation data that is acquired from the portable storage medium.

Figure 2:
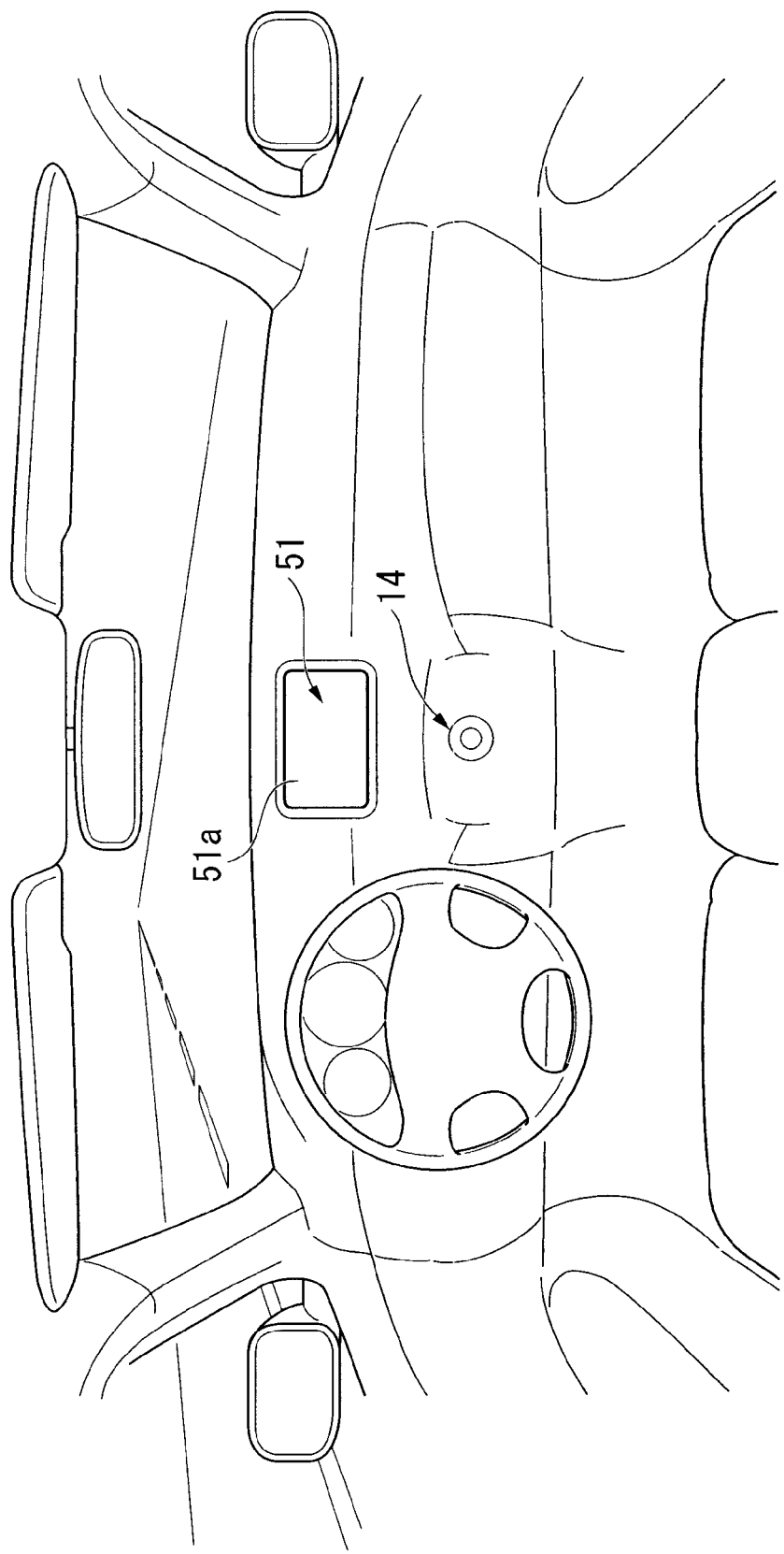
FIG. 2 is a drawing that shows one example of the configuration state of the input operation portion of the navigation device according to one embodiment of the present invention.
Figure 3:
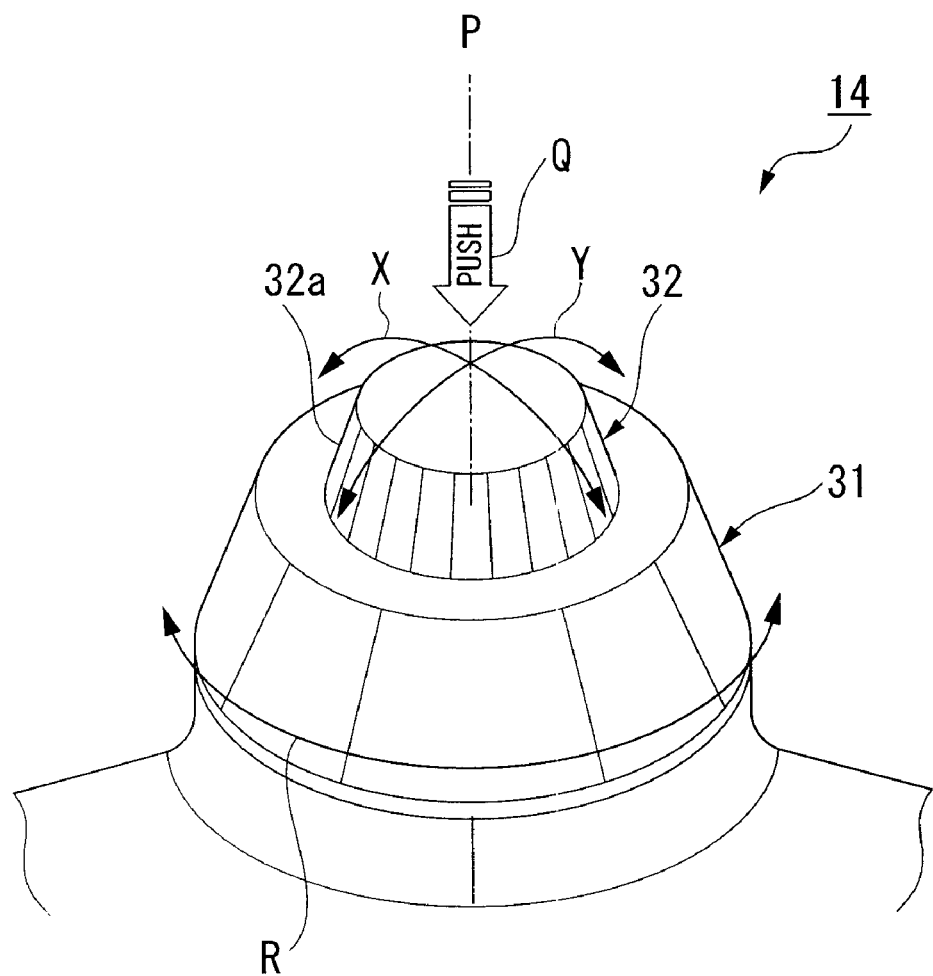
FIG. 3 is a perspective view of the input operation portion of the navigation device according to one embodiment of the present invention.
Figure 4:
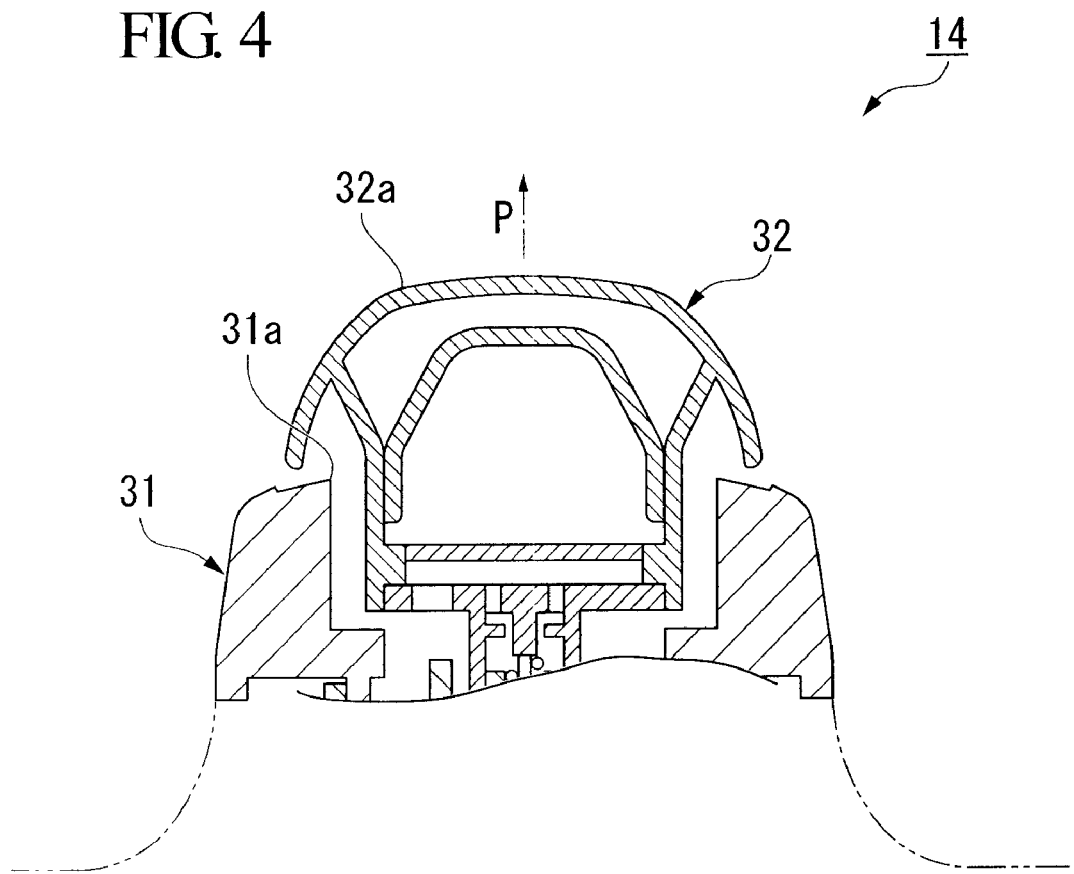
FIG. 4 is a cross-sectional view of the input operation portion of the navigation device according to one embodiment of the present invention.

The input operation portion 14 is constituted by a rotation operation member 31 and a slide operation member 32 that project from the instrument panel at a position that is shifted downward from the display device 51 of the output portion 16, as shown for example in FIG. 2 to FIG. 4.

The rotation operation member 31 of substantially a cylindrical shape is capable of being rotated about a P axis (for example, the direction shown with the arrow R in FIG. 3).

The slide operation member 32 of substantially a cylindrical shape, the outer diameter of which is smaller than the inner diameter of the rotation operation member 31, is disposed in the inner side of the operation member 31 so as to be concentric with the rotation operation member 31. A distal end portion 32*a* of the slide operation member 32 is arranged so as to protrude from an opening end 31*a* of the rotation operation member 31. The slide operation member 32 can be displaced in a direction of the P axis and arbitrary directions perpendicular to the P axis (for example, in directions shown by the arrows X and Y in FIG. 3).

Predetermined reference positions for the slide operation member 32 are each set in the direction of the P axis and the direction perpendicular to the P axis. If no input operation by an operator (for example, a press operation in the direction of the P axis, or a slide operation in a direction perpendicular to the P axis) is performed, it is set to automatically return to the reference positions by a suitable restore mechanism (not shown in the drawings).

In addition, the input operation portion 14 has a sensor (not shown in the drawings) such as an encoder that detects a rotation angle and a rotation rate of the rotation operation member 31 and a sensor (not shown in the drawings) that detects predetermined displacements of the slide operation member 32 in the direction of the P axis and a direction perpendicular to the P axis. Signals of detected values output from these sensors are input to the ECU 15.

The ECU 15 has, for example, a storage portion 41, a navigation processing portion 42, an output control portion 43, an update processing portion 44, an area selecting portion 45, and a time setting portion 46.

The storage portion 41 stores the current location that is for example output from the current location detecting portion 11 and a destination that is set for example through an input operation by an operator to the input operation portion 14. In addition, it stores data that is required in various control processes of the ECU 15.

The navigation processing portion 42 for example performs map matching to road data obtained from the navigation data storage portion 12 based on the current location output from the current location detecting portion 11. In addition, the navigation processing portion 42 executes processing such as route search and route guidance to a destination that is set in accordance with an input operation by an operator to the input operation portion 14, and outputs a control command that instructs operation of the display device 51 and a speaker 52 of the output portion 16.

The output control portion 43 controls the display device 51 and the speaker 52 of the output portion 16 in accordance with a control command that is output from the navigation processing portion 42, the update processing portion 44, the area selecting portion 45, and the time setting portion 46 or an input operation of the operator to the input operation portion 14.

The update processing portion 44 updates the navigation data that is housed in the navigation data storage portion 12 with new navigation data that is acquired from the navigation data acquiring portion 13.

This update processing portion 44, as described below, stops and prohibits execution of navigation operations by the navigation processing portion 42 (for example, display of maps and route guidance and the like on the display device 51 of the output portion 16), and executes a first updating process (full power update) that updates navigation data relating to a first area (full power update area) that includes at least the vicinity of the current location of the vehicle that is detected by the current location detecting portion 11 among the new navigation data that is stored in a portable storage medium that can be read by the navigation data acquiring portion 13. The update processing portion 44 can also perform a second updating process (parallel update) that performs updating of navigation data relating to a second area (parallel update area) that is an area other than the first area concurrently with the execution of a navigation operation by the navigation processing portion 42, after updating of the navigation data relating to the first area (full power update area) is completed.

That is, the update processing portion 44 executes only the full power update on all of the navigation data, or executes only the parallel update on all of the navigation data, or executes the full power update on a portion of the navigation data and the parallel update on the other navigation data other than that portion. Executing these updates the navigation data that is housed in the navigation data storage portion 12 with the new navigation data that is acquired from the navigation data acquiring portion 13.

Hereinbelow, a process that executes only a full power update is called a mass update ("full Power"), and a process that executes a full power update and a parallel update is called a background update ("Background").

For example, in the mass update, the navigation data that is housed in the navigation data storage portion 12 is deleted. Then, the new navigation data that is acquired from the portable storage medium by the navigation data acquiring portion 13 is stored in the storage area that is created by this deletion.

For example, in the background update, first, the new navigation data relating to the full power update area that is acquired from the portable storage medium by the navigation data acquiring portion 13 is stored in a predetermined full power update storage area that is secured in advance in the navigation data storage portion 12.

The execution of a navigation operation using navigation data that is stored other than in the full power update storage area of the navigation data storage portion 12 is stopped or prohibited. Then, a setting change is performed so as to execute the navigation operation with the new navigation data that is stored in the full power update storage area instead of the navigation data that is housed other than in the full power update storage area of the navigation data storage portion 12, and the execution of the navigation operation is allowed. Then, the navigation data that is housed other than in the full power update storage area of the navigation data storage portion 12 is deleted, and new navigation data that relates to the parallel update area that is acquired from the portable storage medium by the navigation data acquiring portion 13 is stored in the storage area that is created by this deletion.

The area selecting portion 45 for example acquires the first area (full power update area) and the second area (parallel update area) that are selected in accordance with an input operation or the like of the operator to the input operation portion 14.

The time setting portion 46 for example acquires the allowed time (full power update time) during which is allowed the execution of the first updating process (full power update) that is set in accordance with an input operation of the operator to the input operation portion 14.

The navigation device 10 according to this embodiment is provided with the aforementioned constitution, and, next, the operation of this navigation device 10 shall be described, in particular the data updating method that updates the navigation data that is housed in the navigation data storage portion 12 with the new navigation data that is acquired from the navigation data acquiring portion 13.

Figure 5:
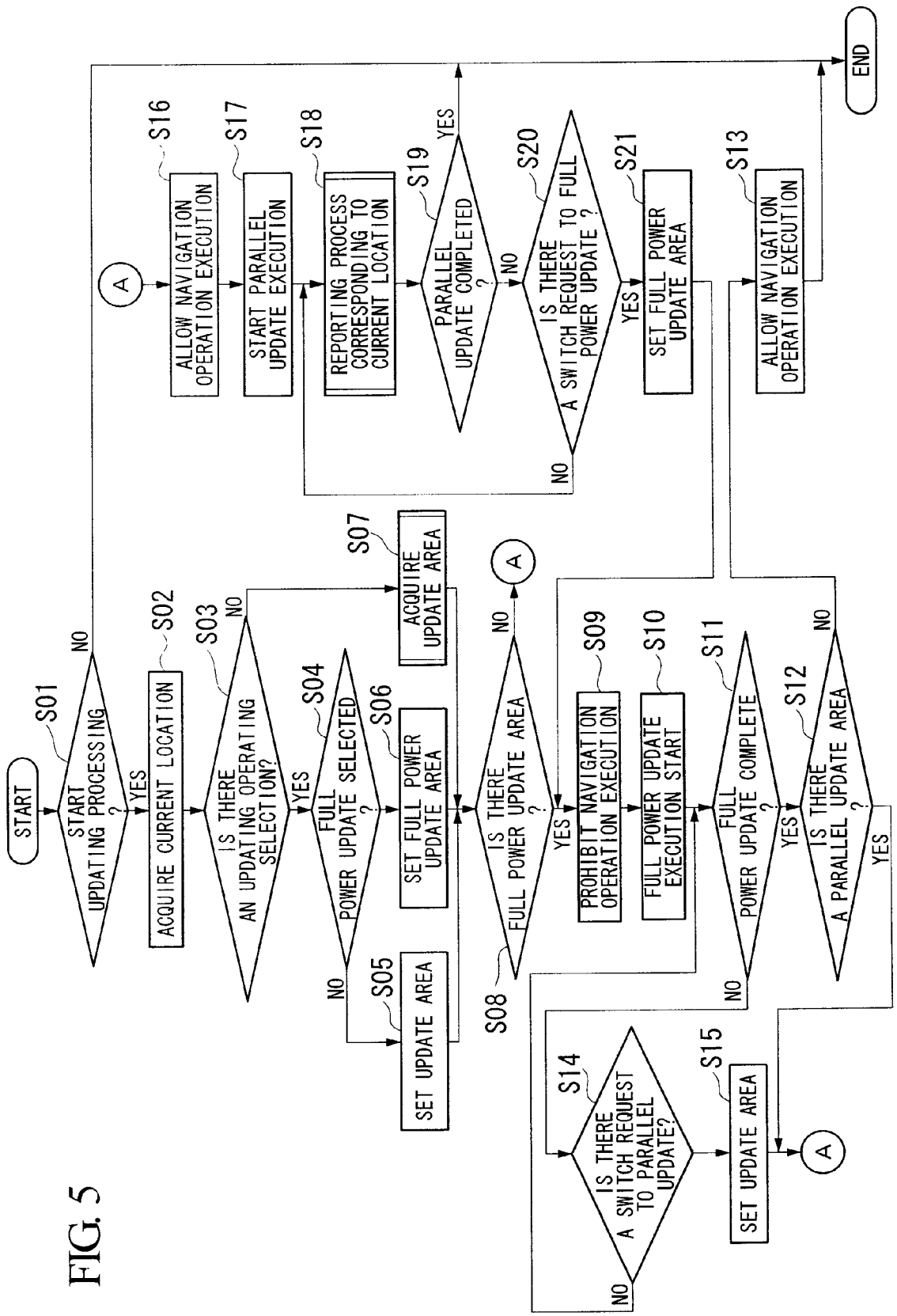
FIG. 5 is flowchart that shows the operation of the navigation device according to one embodiment of the present invention, in particular, the data updating method that updates navigation data that is housed in the navigation data storing portion with new navigation data that is acquired from the navigation data acquiring portion.

First, for example in the Step S01 shown in FIG. 5, a portable storage medium on which for example new navigation data is stored is mounted in the reading device of the navigation data acquiring portion 13. Then, by determining whether or not it is in a readable state, it determines whether or not the start of the updating process is instructed.

In the case of the determination result being "NO", the series of processes is ended.

On the other hand, in the case of the determination result being "YES", the process proceeds to Step S02.

In Step S02, the current location of the vehicle that is detected by the current location detecting portion 11 is acquired.

In Step S03, it is determined whether or not execution of a mass update or a background update is selected as the update operation according to for example an input operation of the operator to the input operation portion 14.

When this determination result is "NO", it proceeds to step S07 described later.

On the other hand, when this determination result is "YES", it proceeds to Step S04.

In Step S04, it is determined whether or not execution of the mass update is selected according to for example an input operation of the operator to the input operation portion 14.

When this determination result is "NO", that is, when execution of the background update is selected, it proceeds to Step S05.

On the other hand, when this determination result is "YES", it proceeds to Step S06.

For example, when execution of the mass update or the background update is selected according to for example an input operation of the operator to the input operation portion 14, the update processing portion 44 causes a command selection menu 61 that instructs execution of a mass update ("Full Power") and a command selection menu 61 that instructs execution of a background update ("Background") to be displayed on the display screen 51a of the display device 51 of the output portion 16, in a selectable manner in accordance with for example an input operation of the operator to the input operation portion 14.

In the Step S05, the full power update area and the parallel update area are set with respect to the full power update and the parallel update to be executed in the background update, and the process proceeds to Step S08 described below.

In this Step S05, for example, similarly to the update area acquisition process in Step S07 described below, the guide route that is set by the navigation processing portion 42 in advance or the arrangement order based on the distance between the current location of the vehicle and the representative point set in advance in each administrative district is made the update order. Then, based on this update order and the predetermined allowed time during which execution of the full power update is allowed, the area data of each administrative district in the navigation data is set as a full power update area or a parallel update area.

In Step S06, the full power update area is set with respect to the full power update executed in the mass update, and the process proceeds to Step S08 described below.

In Step S06, for example, similarly to the update area acquisition process in Step S07 described below, the guide route that is set by the navigation processing portion 42 in advance or the arrangement order based on the distance between the current location of the vehicle and the representative point set in advance in each administrative district is made the update order. Then, based on this update order, the area data of each administrative district in the navigation data is updated as a full power update area.

In Step S07, the update area acquisition process described later is executed.

In Step S08, it is determined whether or not the full power update area has been set.

If this determination result is "NO", the process proceeds to Step S16.

On the other hand, if this determination result is "YES", the process proceeds to step S09.

In Step S09, execution of a navigation operation by the navigation processing portion 42 is stopped and prohibited.

In Step S10, execution of full power update is started.

In Step S11, it is determined whether or not the execution of the full power update is completed.

If this determination result is "NO", the process proceeds to Step S14 described below.

On the other hand, if this determination result is "YES", the process proceeds to step S12.

In Step S12, it is determined whether or not the parallel update area has been set.

If this determination result is "YES", the process proceeds to Step S16 described below.

On the other hand, if this determination result is "NO", the process proceeds to Step S13.

In Step S13, the execution of the navigation operation by the navigation processing portion 42 is allowed, and the series of processes is ended.

In Step S14, it is determined whether or not there is a switch request from the full power update execution state to the parallel update execution state.

If this determination result is "NO", the processing returns to Step S11 described above.

On the other hand, if this determination result is "YES", the processing proceeds to Step S15.

In Step S15, the execution of the full power update is stopped, the parallel update area is set for the parallel update, and the processing proceeds to the Step S16 described below.

Figure 7A:
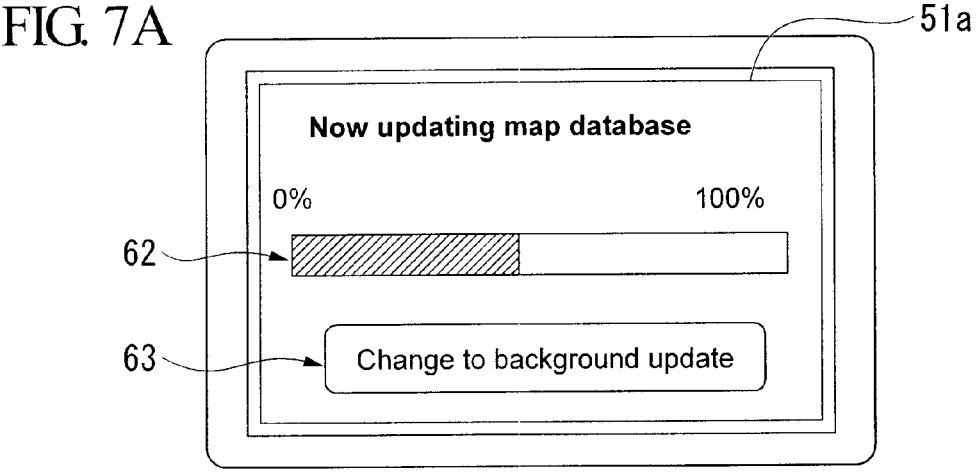
FIG. 7A is a drawing that shows one example of the display screen of the navigation device according to one embodiment of the present invention (during full power update).

In the full power update execution state, the update processing portion 44 causes an image 62 that shows the progress state of the full power update to be displayed on the display screen 51a of the display device 51 of the output portion 16, as shown for example in FIG. 7A. Together with this, it causes a command selection menu 63 that instructs the switch from the full power update execution state to the parallel update execution state to be displayed as selectable in accordance with the input operation of the operator to the input operation portion 14, for example.

In Step S16, execution of the navigation operation by the navigation processing portion 42 is allowed. Thereby, as shown for example in FIG. 7B, the map of the vicinity of the current location of the vehicle is displayed on the display screen 51a of the display device 51 of the output portion 16 in accordance with the navigation operation by the navigation processing portion 42, and the route guidance is performed.

In Step S17, the execution of the parallel update is started.

In Step S18, a reporting process corresponding to the current location described below is executed.

In Step S19, it is determined whether or not the execution of the parallel update is completed.

If this determination result is "YES", the series of processes is ended.

On the other hand, if this determination result is "NO", the processing proceeds to Step S20.

In Step S20, it is determined whether or not there is a switch request from the parallel update execution state to the full power update execution state.

If this determination result is "NO", the processing returns to Step S18 described above.

On the other hand, if this determination result is "YES", the processing proceeds to Step S21.

In Step S21, the execution of the parallel update is stopped, the full power update area is set for the full power update, and the processing returns to the Step S09 described above.

Figure 7B:
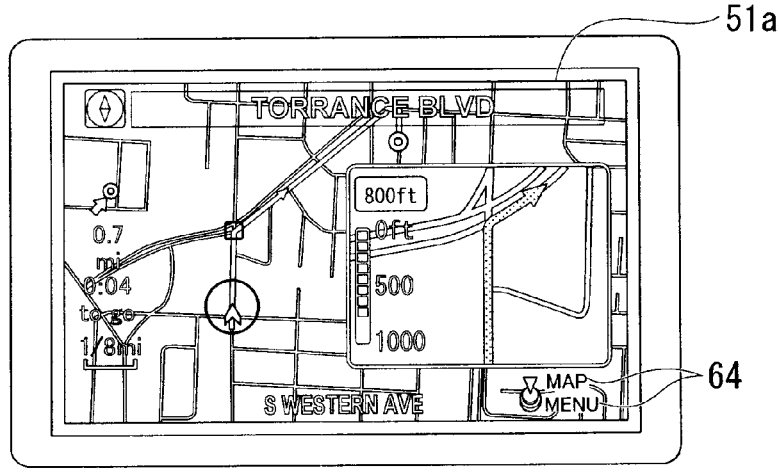
FIG. 7B is a drawing that shows one example of the display screen of the navigation device according to one embodiment of the present invention (during route guidance execution).
Figure 7C:
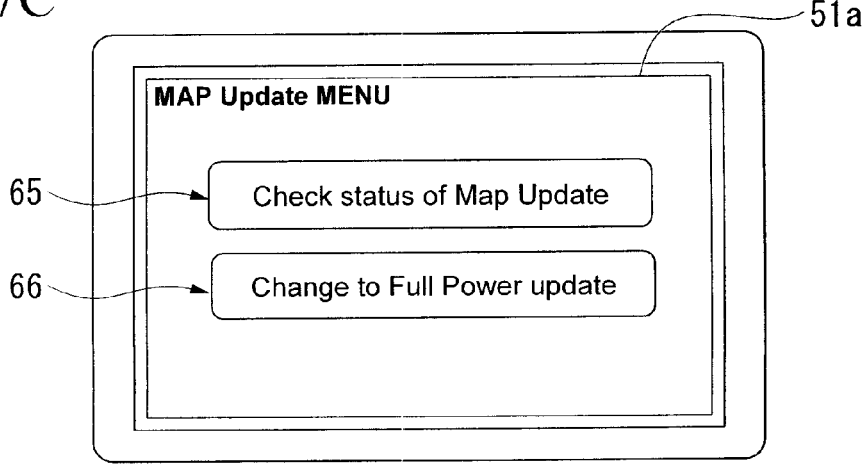
FIG. 7C is a drawing that shows one example of the display screen of the navigation device according to one embodiment of the present invention (during parallel update).

In the parallel update execution state, the update processing portion 42 is capable of displaying a map of the vicinity of the current location of the vehicle on the display screen 51a of the display device 51 of the output portion 16 in accordance with the navigation operation as shown for example in FIG. 7B, based on the navigation data that is stored in the navigation data storage portion 12, that is, that new navigation data that relates to the full power update area that is updated by the full power update prior to the start of execution of the parallel update. In this case, together with the map, a command selection menu 64 that instructs a transition to a display state of a predetermined menu or another map ("MENU", "MAP") is displayed on the display screen 51a, and for example when the command selection menu 64 that instructs a transition to a display state of a predetermined menu ("MENU") is selected in accordance with the input operation of the operator to the input operation portion 14, for example, as shown for example in FIG. 7C, a command selection menu 65 that instructs a transition to a display state that shows the progress state of the parallel update, and a command selection menu 66 that instructs a switch from the parallel update execution state to the full power update execution state is displayed to be selectable in accordance with the input operation of the operator to the input operation portion 14, for example.

Hereinbelow, the process of the update area acquisition in the aforementioned Step S07 shall be described.

Figure 8:
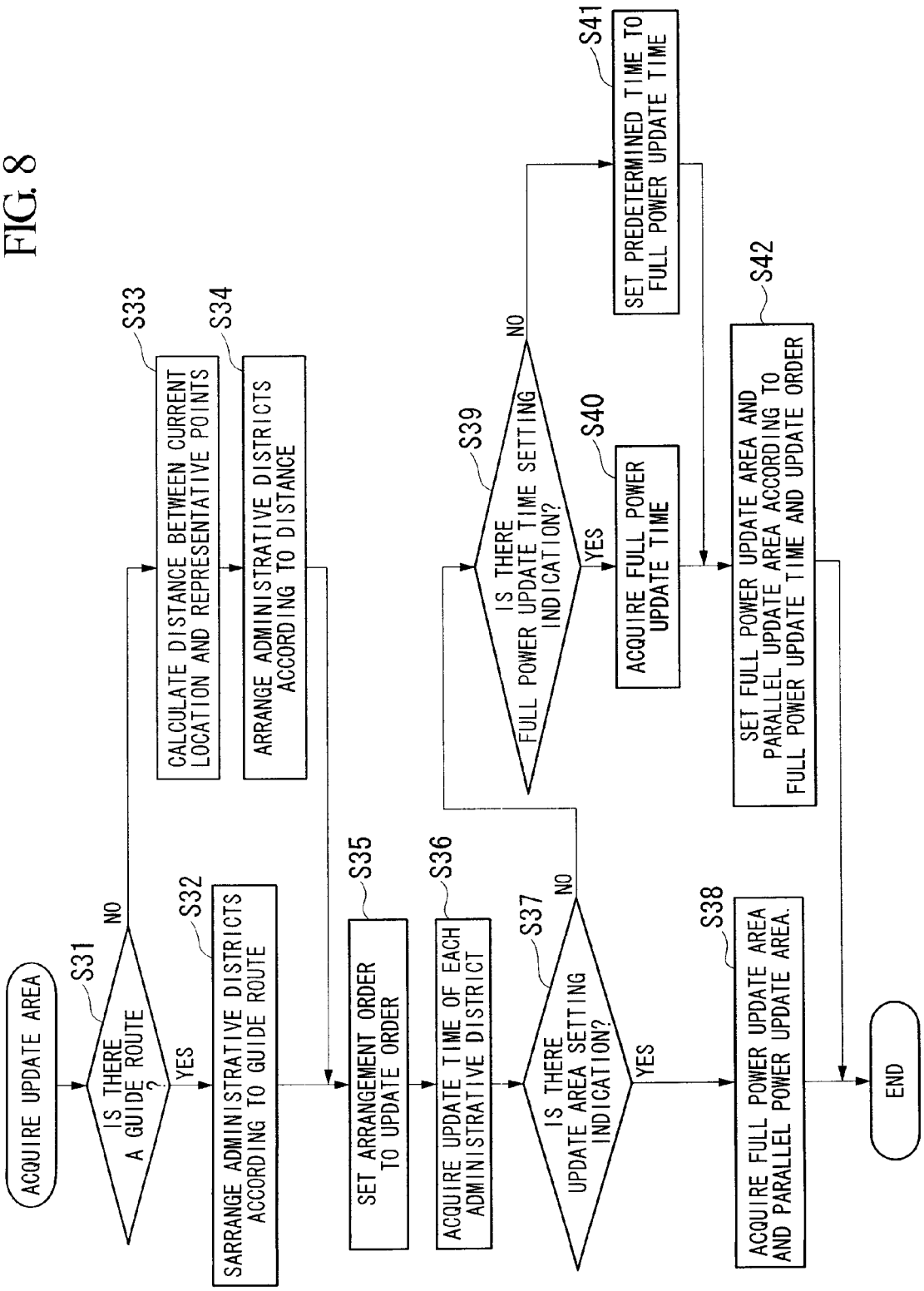
FIG. 8 is a flowchart that shows the process of update area acquisition shown in FIG. 5.

First, in the Step S31 shown in FIG. 8 for example, it is determined whether or not a guide route is set by the navigation processing portion 42.

If this determination result is "NO", the process proceeds to Step S33 described below.

On the other hand, if this determination result is "YES", the process proceeds to Step S32 described below.

In Step S32, for a plurality of data that are partitioned by each administrative district that constitutes the navigation data, administrative districts that lie on the guide route are arranged in an order of proximity to the current location of the vehicle in accordance with this guide route. Then, the process proceeds to Step S35 described below.

In Step S33, for a plurality of data that are partitioned by each administrative district that constitutes the navigation data, for example as shown in FIGS. 9A and B, the distance between the current location of the vehicle and the representative point that is set beforehand in each administrative district is computed.

In Step S34, all of the administrative districts in the navigation data are arranged in the order of shortness of distance according to the distance between the current location of the vehicle and the representative point.

In Step S35, the order of arrangement of the administrative districts set in Step S32 or Step S34 mentioned above is set as the update order.

For example, in FIGS. 9A and B, for the plurality of administrative districts CA, NV, AZ, UT, CO, NM, ID, OR . . . , representative points (for example, the positions of appropriate cities and the like) that are distributed in each administrative district are set. The representative point that is closest to the current location of the vehicle is selected from among the plurality of representative points in each administrative district other than the administrative district to which the current location of the vehicle belongs (for example, the administrative district CA), and the distance between the selected representative point and the current location of the vehicle is set as distance dNV, dAZ, dUT, dCO, dNM, dID, dOR, . . . for each administrative district.

Figure 9B:
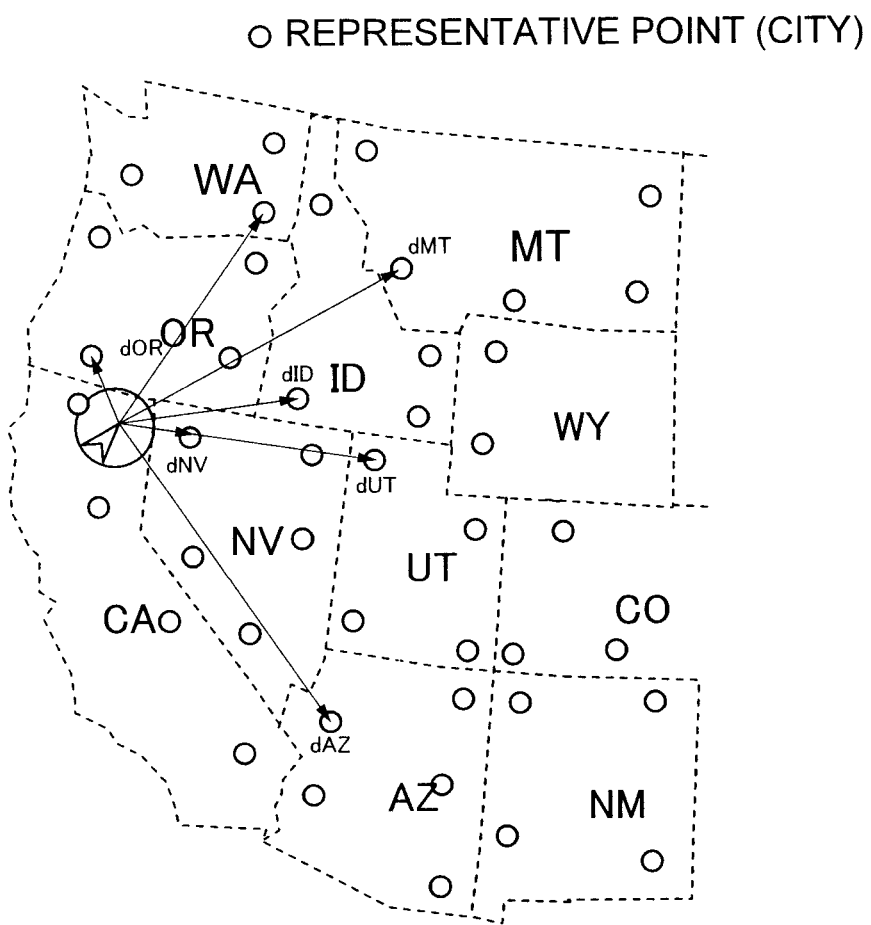
FIG. 9B is a drawing that shows an example of representative points that are set in advance in each area (administrative district) in navigation data according to one embodiment of the present invention.

Then, the update order of each administrative district is set from the administrative district that the current location of the vehicle belongs to (for example, the administrative district CA), in the order of shortness of the distances dNV, dAZ, dUT, dCO, dNM, dID, dOR . . . . Then, for example in FIG. 9A, with respect to distance dNV<dAZ<dUT<dNM<dID<dOR, the update order of the administrative districts becomes in turn CA, NV, AZ, UT, CO, NM, ID, OR, . . . . Also, for example in FIG. 9B, with respect to distance dNV<dOR<dID<dUT<dWA<dMT<dAZ, . . . , the update order of the administrative districts becomes in turn CA, NV, OR, ID, UT, WA, MT, AZ, . . . .

In Step S36, based on the data capacity of the plurality of data divided into administrative districts that constitutes the new navigation data that is stored for example in the portable storage medium that is mounted in the reading device of the navigation data acquiring portion 13 and the update speed in full power update, the update time of each administrative district that is required for full power update of the data of each administrative district is acquired.

In Step S37, it is determined whether or not an update area setting instruction has been output in accordance with an input operation by an operator to the input operation portion 14 for example.

If this determination result is "NO", the processing proceeds to Step S39.

On the other hand, if this determination result is "YES", the processing proceeds to Step S38.

Figure 10A:
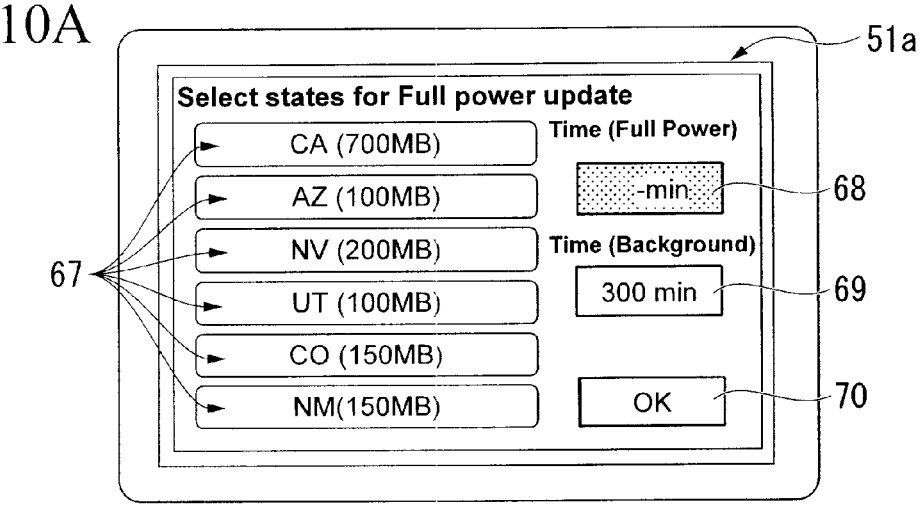
FIG. 10A is a drawing that shows one example of the display screen of the navigation device according to one embodiment of the present invention.

In the case of the update area setting instruction being output in accordance with an input operation by an operator to the input operation portion 14 for example, as shown for example in FIG. 10A, each data capacity 67 for each administrative district that constitutes the new navigation data is made selectable in accordance with an input operation by an operator to the input operation portion 14 for example and displayed on the display screen 51a of the display device 51 of the output portion 16 in the update order.

Figure 10B:
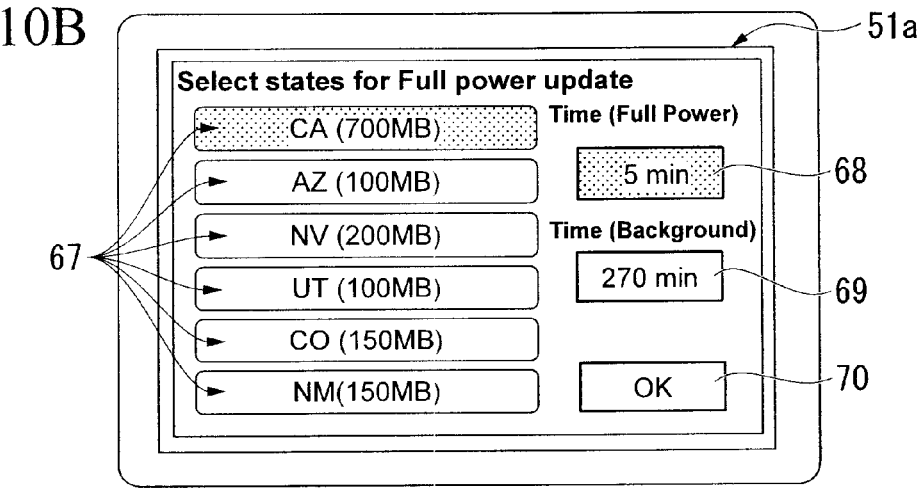
FIG. 10B is a drawing that shows one example of the display screen of the navigation device according to one embodiment of the present invention.
Figure 10C:
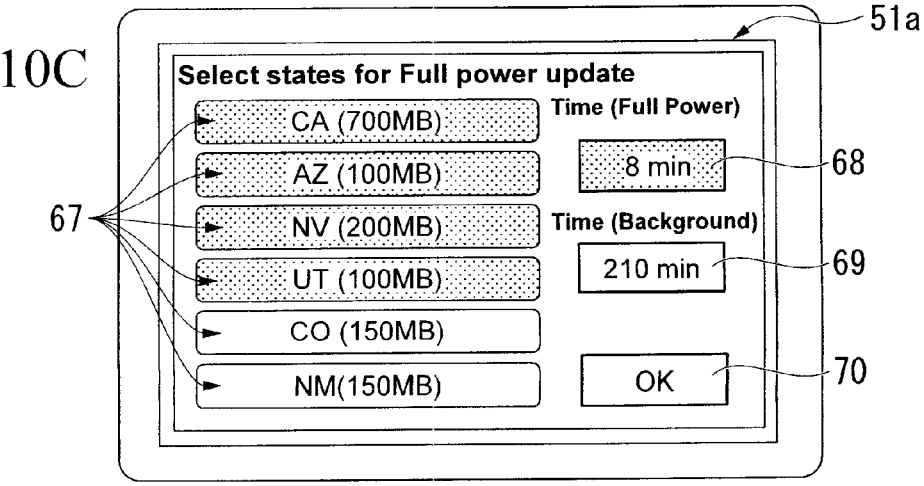
FIG. 10C is a drawing that shows one example of the display screen of the navigation device according to one embodiment of the present invention.

As shown for example in FIG. 10B and FIG. 10C, the data capacity 67 of each administrative district that is selected by the operator in accordance with the input operation by an operator to the input operation portion 14 for example is highlighted at the timing of being selected. Together with this, the integrated value of the update time of the data capacity 67 of each administrative district that is selected by the operator is displayed as a time required for full power update 68. Moreover, a time required for parallel update 69 for data of other administrative districts other than the administrative district that was selected by the operator is displayed.

When the command selection menu 70 ("OK") that instructs confirmation of the setting of the update area is selected by the operator in accordance with for example an input operation of the operator to the input operation portion 14, each administrative district that corresponds to the data capacity 67 that is highlighted at this point is set as the full power update area. Then, other administrative areas other than the administrative area selected by the operator are set as the parallel update area.

In Step S38, in accordance with for example an input operation of the operator to the input operation portion 14, the full power update area and the parallel update area that are set are acquired, and the series of processes is ended.

In Step S39, in accordance with for example an input operation of the operator to the input operation portion 14, it is determined whether or not a full power update time that is set in advance by the operator exists.

If this determination result is "NO", the process proceeds to Step S41 described below.

On the other hand, if this determination result is "YES", the process proceeds to Step S40.

In Step S40, the full power update time that is set in advance by the operator is acquired, and the process proceeds to Step S42 described below.

In Step S41, a predetermined time is set as the full power update time.

In Step S42, in accordance with the full power update time and the update order, the full power update area and the parallel update area are set, and the series of processes is ended.

As shown for example in FIG. 11, with respect to predetermined administrative districts CA, NV, AZ, UT, CO, NM, ID, OR . . . , in correspondence to the distance dNV<dAZ<dUT<dCO<dNM<dID<dOR, . . . between the representative point of each administrative district and the current location of the vehicle, the order of update of each administrative district is CA, NV, AZ, UT, CO, NM, ID, OR, . . . in turn, and in the case of the update speed of the full power update being 100 (MB/min) and the full power update time being 10 (min), only the administrative districts CA, NV, AZ are set as the full power update area, while the other administrative districts UT, CO, NM, ID, OR . . . are set as the parallel update area.

Hereinbelow, the reporting process corresponding to the current location in Step S18 described above shall be described.

Figure 12:
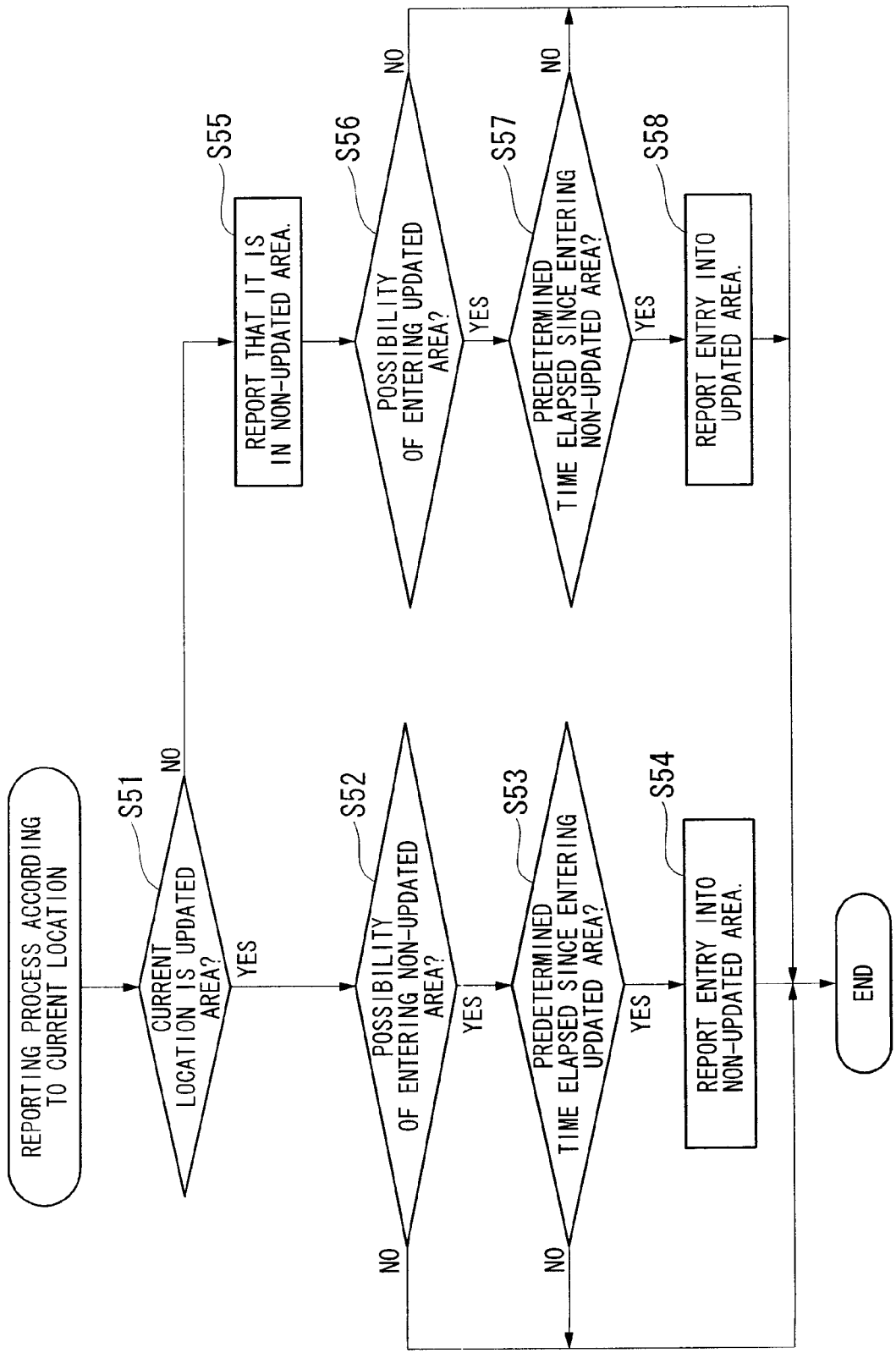
FIG. 12 is a flowchart that shows the reporting process corresponding to the current location shown in FIG. 5.

First, in Step S51 shown for example in FIG. 12, it is determined whether or not the current location of the vehicle is an updated area.

If this determination result is "NO", for example in the state of the vehicle positions T3, T6 shown in FIG. 13, the process proceeds to Step S55 described below.

Figure 13:
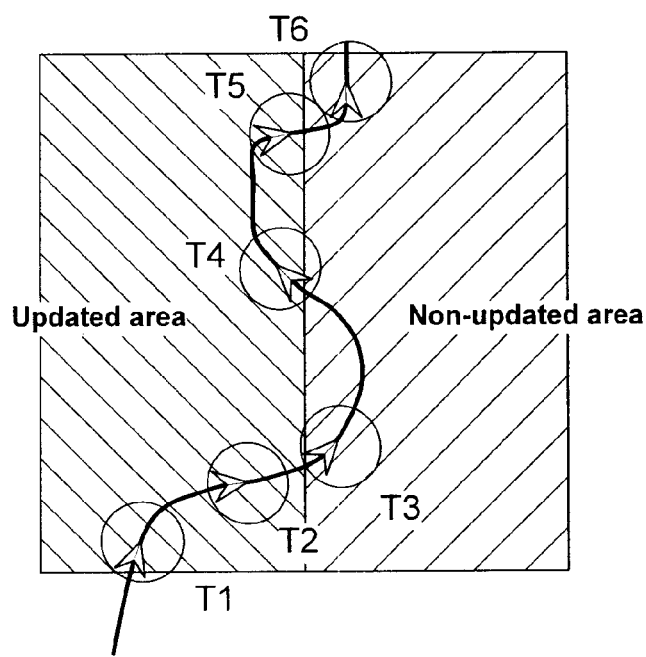
FIG. 13 is a drawing that shows an example of the current location of a vehicle and an updated area and a non-updated area of the navigation data according to one embodiment of the present invention.

On the other hand, in the case of this determination result being "YES", for example in the state of the vehicle positions T1, T2, T4, T5 shown in FIG. 13, the process proceeds to Step S52.

In Step S52, it is determined whether or not there is a possibility of the vehicle entering a non-updated area.

If this determination result is "YES", for example in the state of the vehicle positions T2, T5 shown in FIG. 13, the process proceeds to Step S53.

On the other hand, if this determination result is "NO", the series of processes is ended.

In Step S53, it is determined whether or not a predetermined time (for example, 5 minutes) has elapsed since the vehicle has entered the updated area.

Figure 14A:
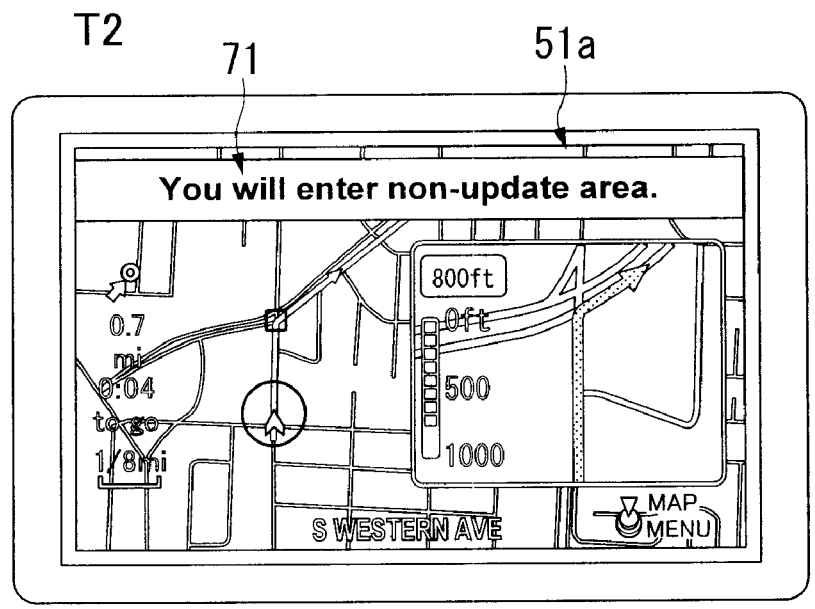
FIG. 14A is a drawing that shows an example of the display screen of the navigation device according to one embodiment of the present invention.

If this determination result is "YES", the process proceeds to Step S54, and in Step S54, as shown for example in FIGS. 14A and C, a predetermined message 71 that reports that there is a possibility of the vehicle entering a non-updated area is displayed on the display screen 51a of the display device 51 of the output portion 16, and the series of processes is ended.

Figure 14B:
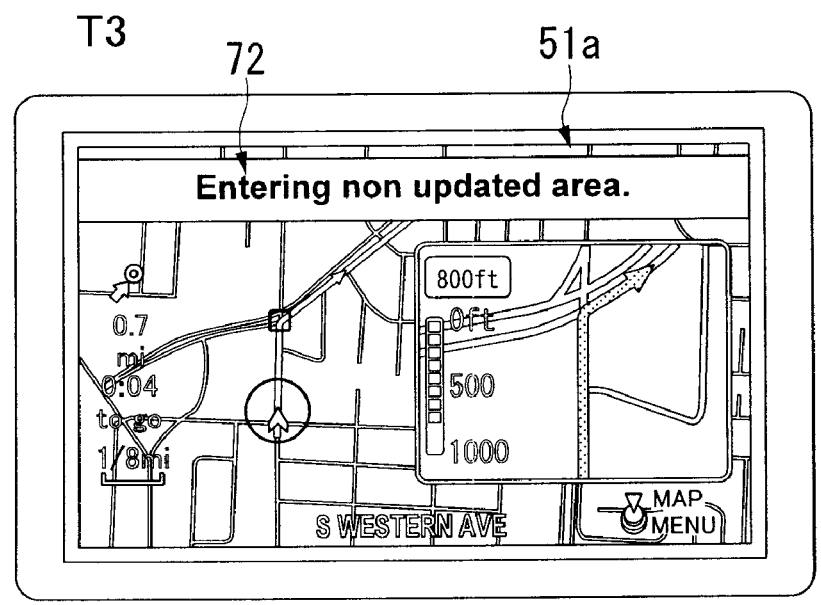
FIG. 14B is a drawing that shows an example of the display screen of the navigation device according to one embodiment of the present invention.
Figure 14C:
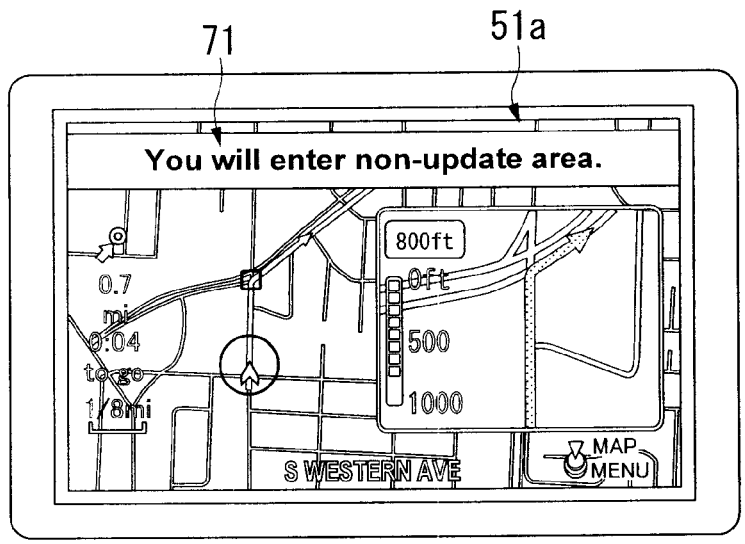
FIG. 14C is a drawing that shows an example of the display screen of the navigation device according to one embodiment of the present invention.
Figure 14D:
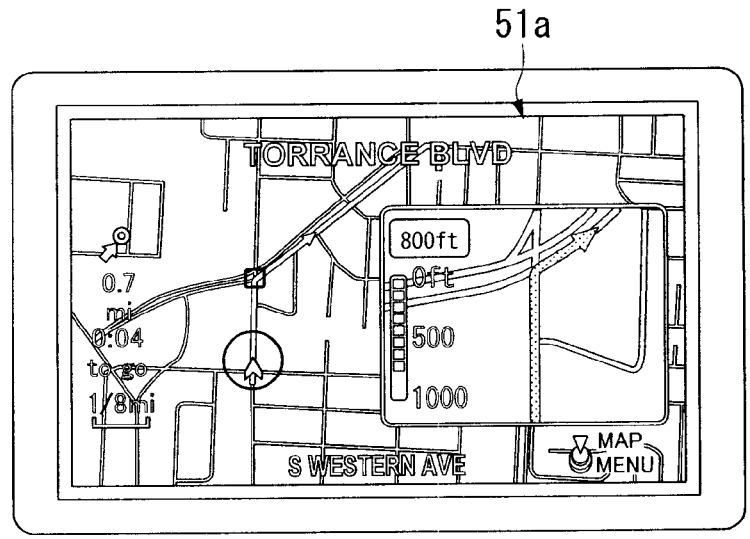
FIG. 14D is a drawing that shows an example of the display screen of the navigation device according to one embodiment of the present invention.

On the other hand, if this determination result is "NO", as shown for example in FIG. 14D, the predetermined message 71 that reports that there is a possibility of the vehicle entering a non-updated area is not displayed on the display screen 51a, and the series of processes is ended.

In the Step S55, as shown for example in FIG. 14B, a predetermined message 72 that reports that the vehicle exists in a non-updated area is displayed on the display screen 51a of the display device 51 of the output portion 16.

In Step S56, it is determined whether or not there is a possibility of the vehicle entering an updated area.

If this determination result is "YES", the process proceeds to Step S57.

On the other hand, if this determination result is "NO", the series of processes is ended.

In Step S57, it is determined whether or not a predetermined time (for example, 5 minutes) has elapsed since the vehicle has entered the non-updated area.

If this determination result is "YES", the process proceeds to Step S58, and in this Step S58, a predetermined message that reports that there is a possibility of the vehicle entering an updated area is displayed on the display screen 51a of the display device 51 of the output portion 16, and the series of processes is ended.

On the other hand, if this determination result is "NO", a predetermined message that reports that there is a possibility of the vehicle entering an updated area is not displayed on the display screen 51a, and the series of processes is ended.

As described above, according to the navigation device 10 and the data updating method of the present embodiment, during updating of navigation data that is stored in the navigation data storage portion 12, the period during which execution of the navigation operation by the navigation processing portion 42 is stopped is only the period required for updating of the navigation data relating to the first area (full power update area) that includes the vicinity of the current location of the vehicle. For example, compared to the case of updating navigation data of an area that covers an excessively broad area, it is possible to shorten the period during which the execution of the navigation operation is stopped.

The navigation data is constituted from a plurality of data that are divided into predetermined administrative districts, and sets at least the area of the administrative district in which the current location of the vehicle belongs to as a full power update area. Thereby, it is possible to suitably set a full power update area corresponding to the navigation data that is updated by a full power update, in which the execution stop of the navigation operation is required.

In addition to the administrative district to which the current location of the vehicle belongs, areas of administrative districts that are selected in order of the shortness of the distance between the current location of the vehicle and the representative point of each administrative district among the plurality of other administrative districts, and in which the time required for execution completion of the full power update is within a predetermined time are made the full power update area. Thereby, it is possible to suitably update the navigation data even in the case of for example there being the possibility of the vehicle crossing a border of an administrative district.

It is possible to accurately reflect the will of the operator in the full power update time that is required for execution completion of the full power update, and it is possible to improve convenience.

It is possible to accurately reflect the will of the operator in the setting of the full power update area and the parallel update area, and it is possible to improve convenience.

It is possible to execute a parallel update in turn with the areas of the administrative districts that are selected in order of the shortness of the distance between the current location of the vehicle and the representative point of each administrative district, or the areas of the administrative districts that are arranged in accordance with the guide route serving as the parallel update area, and in the parallel update it is possible to perform the update in the order of navigation data in which the priority of update is relatively high.

It is possible to switch between the full power update execution state and the parallel update execution state in accordance with the input operation by the operator. Thereby, it is possible to flexibly control the update operation of the navigation data.

At the start of the update operation, since it is possible to select and execute either the full power update or parallel update, it is possible to flexibly control the update operation of the navigation data.

It is possible to make the operator accurately grasp whether the current location of the vehicle belongs to an updated area or a non-updated area of the navigation data.

Figure 6:
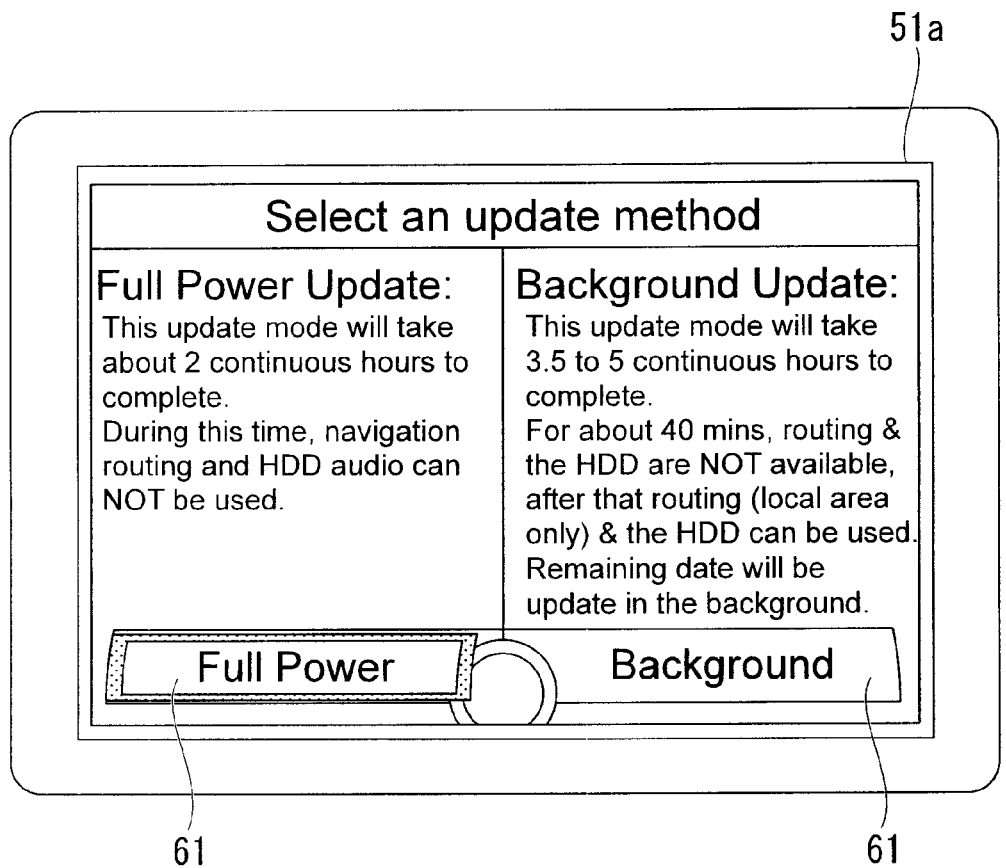
FIG. 6 is a drawing that shows one example of the display screen of the navigation device according to one embodiment of the present invention

In the aforementioned embodiment, the background update was made a process that executes a full power update and a parallel update. However, it is not limited thereto, and for example the background update may be made a process that executes only a parallel update. In this case, for example, full power update or parallel update is selected by the command selection menu 61 ("Full Power"), ("Background") shown in FIG. 6, for example.

In the aforementioned embodiment, it is possible to switch between the full power update execution state and the parallel update execution state in accordance with an input operation of the operator as shown in Step S14 and Step S20. However, it is not limited thereto, and it is possible to switch between the mass update execution state and the background update execution state in accordance with an input operation of the operator.

In the aforementioned embodiment, as shown in Step S41, in the case of the update area setting instruction and the full power update time not existing, the full power update area is set in accordance with the update order and the predetermined time. However, it is not limited thereto, and only the area of the administrative district to which the current location of the vehicle belongs may be made the full power update area, and for example only the area of the administrative district to which the current location of the vehicle belongs and the area of the administrative district adjacent to the administrative district to which the current location of the vehicle belongs may be made the full power update area.

In the aforementioned embodiment, each administrative district was arranged depending on the distance between the current location of the vehicle and the representative point of every administrative district, as shown in Step S33 and Step S34. However, it is not limited thereto, and each administrative district may be arranged depending on for example the distance between the current location of the vehicle and the border of every administrative district.

In the aforementioned embodiment, the navigation data acquiring portion 13 is provided with a reading device for a portable storage medium. However, it is not limited thereto, and it may for example be provided with a communication device that is capable of communication with an external server device (not illustrated) in which new navigation data is stored, and it may acquire the new navigation data that is housed in the server device by communication.

In the aforementioned embodiment, the vehicle existing in a non-updated area is reported as shown in Step S55. However, it is not limited thereto, and for example the vehicle existing in an updated area may be reported.

The navigation device 10 according to one embodiment of the present invention was mounted in a vehicle. However, it is not limited thereto, and may also be mounted in another movable body.

The navigation device 10 according to one embodiment of the present invention may be one that is realized by special-purpose hardware, or may be one that is constituted by memory and a CPU, and by loading into memory and executing a program (a data update program) for realizing the function of the navigation device 10, in particular the data update function that updates the navigation data that is housed in the navigation data storage portion 12 with new navigation data that is acquired from the navigation data acquiring portion 13, realizes that function.

A program for data update according to the aforementioned invention is stored in a computer-readable storage medium, and by causing the program that is stored in this storage medium to be read into a computer system and executing it, the updating of navigation data may be performed. Note that a computer system here may be one that includes an operating system and hardware such as peripheral devices.

A computer-readable storage medium portion a portable medium such as a DVD or a memory card, and a storage device such as a hard disk that is built into a computer system. Furthermore, the computer-readable storage medium also includes one that dynamically holds a program for a short time such as a communication line in the case of transmitting a program through a network such as the Internet or the like or a communication line such as a telephone line or the like, and also includes one that holds the program for a certain time, such as a volatile memory in a computer system that consists of a server or client.

Also, the program may be one for realizing a portion of the abovementioned functions, and it is also possible to realize the abovementioned functions in combination with a program that has already been stored in the computer system.

INDUSTRIAL APPLICABILITY

According to the navigation device, data updating method, and program of the present invention, it is possible to shorten the time required for updating of navigation data while ensuring a desired navigation operation.

The invention claimed is:

1. A navigation device mounted in a movable body, comprising:
   a first storing portion configured to store a first navigation data;
   an acquiring portion configured to acquire a second navigation data from an external second storing portion;
   a movable body location detecting portion configured to detect a location of the movable body;
   a navigation operation executing portion configured to execute a predetermined navigation operation based on the location of the movable body detected by the movable body location detecting portion, and the first navigation data stored in the first storing portion; and
   an updating portion configured to update the first navigation data stored in the first storing portion with the second navigation data by executing a first updating process and a second updating process, wherein
   the first updating process includes stopping the execution of the navigation operation by the navigation operation executing portion, and updating a portion of the first navigation data corresponding to a first area including a vicinity of the location of the movable body detected by the movable body location detecting portion; and
   the second updating process is executed after the first updating process is completed and includes resuming the execution of the navigation operation by the navigation operation executing portion, and updating a portion of the first navigation data corresponding to a second area different from the first area, the second updating process executed in parallel with the navigation operation by the navigation operation executing portion.

2. The navigation device according to claim 1, wherein:
   the first navigation data stored in the first storing portion and the second navigation data stored in the second storing portion being respectively divided into a plurality of areas, said plurality of areas being predetermined and fixed; and
   the first area is one area in which the location of the movable body is detected by the movable body location detecting portion, selected from among the plurality of areas, and the second area includes all remaining areas of the plurality of areas.

3. The navigation device according to claim 1, wherein:
   the first navigation data stored in the first storing portion and the second navigation data stored in the second storing portion being respectively divided into a plurality of areas, said plurality of areas being predetermined and fixed; and
   the first area is one area in which the location of the movable body is detected by the movable body location detecting portion and at least one area adjacent thereto, selected from among the plurality of areas, and the second area includes all remaining areas of the plurality of areas.

4. The navigation device according to claim 1, wherein:
   the first navigation data stored in the first storing portion and the second navigation data stored in the second storing portion being respectively divided into a plurality of areas, each of the plurality of areas having a representative point, said plurality of areas and the representative points being predetermined and fixed;
   the updating portion arranges each of the plurality of areas in an order of shortness of distance between the location of the movable body detected by the movable body location detecting portion and the representative point within each of the plurality of areas; and
   one area in which the location of the movable body is detected by the movable body location detecting portion and an area from among the plurality of the areas that can be updated within a predetermined time according to the order are selected as the first area, and the second area includes all remaining areas of the plurality of areas.

5. The navigation device according to claim 4, further comprising a time setting portion that sets the predetermined time in accordance with an input operation of the operator.

6. The navigation device according to claim 1, further comprising:
an area selecting portion that configured to select an arbitrary area corresponding to an input operation of the operator; and
a reporting portion configured to report a time required for executing the first updating process by the updating portion, wherein
the first navigation data stored in the first storing portion and the second navigation data stored in the second storing portion are respectively divided into a plurality of areas, said plurality of areas being predetermined and fixed;
the area selecting portion selects the arbitrary area from among the plurality of areas;
the reporting portion reports the updating time at each timing in which the arbitrary area is selected by the area selecting portion; and
the first area includes the area in which the location of the movable body is detected by the movable body location detecting portion and the arbitrary area selected by the area selecting portion, and the second area includes all remaining areas of the plurality of areas.

7. The navigation device according to claim 1, wherein:
the first navigation data stored in the first storing portion and the second navigation data stored in the second storing portion are respectively divided into a plurality of areas, each of the plurality of areas having a representative point, said plurality of areas and the representative points being predetermined and fixed;
the updating portion arranges each of the plurality of areas in an order of shortness of distance between the location of the movable body detected by the movable body location detecting portion and the representative point within each of the plurality of areas; and
the updating portion performs the second updating process with each of the plurality of areas in turn according to the arrangement serving as the second area.

8. The navigation device according to claim 1, further comprising:
a guide route setting portion configured to set a guide route of the movable body, wherein:
the first navigation data stored in the first storing portion and the second navigation data stored in the second storing portion are respectively divided into a plurality of areas, said plurality of areas being predetermined and fixed;
each of the plurality of areas is arranged according to the guide route set by the guide route setting portion; and
the updating portion performs the second updating process with each of the plurality of area in turn according to the arrangement serving as the second area.

9. The navigation device according to claim 1, wherein the updating portion is provided with a switching portion that is capable of switching between the execution of the first updating process and the execution of the second updating process.

10. The navigation device according to claim 1, wherein the updating portion is provided with a selecting and executing portion that selects and executes the first updating process or the second updating process.

11. The navigation device according to claim 1, further comprising a location reporting portion configured to, in the execution of either the first updating process and the second updating process by the updating portion, report whether the location of the movable body detected by the movable body location detecting portion belongs to an area of the first navigation data stored in the first storing portion, or an area of the second navigation data stored in the second storing portion.

12. A navigation data updating method of a navigation device mounted in a movable body that updates a first navigation data, stored in a first storing portion to a second navigation data stored in an external second storing portion, comprising:
executing a first updating process using an updating processing portion of the navigation device, the first updating process including stopping the execution of a navigation operation by the navigation device, and updating a portion of the first navigation data that corresponds to a first area including a vicinity of a location of the movable body; and
after the first updating process is completed, executing a second updating process using the updating processing portion of the navigation device, the second updating process including resuming the execution of the navigation operation by the navigation device, and updating a portion of the first navigation data corresponding to a second area different from the first area, the second updating process executed in parallel with the execution of the navigation operation.

13. A program stored on a non-transitory computer readable medium for causing a computer of a navigation device mounted in a movable body to update a first navigation data stored in a first storing portion to a second navigation data stored in an external second storing portion, comprising:
a movable body location detecting portion that detects the location of the movable body;
a navigation operation executing portion that executes a predetermined navigation operation based on the location of the movable body detected by the movable body location detecting portion, and the first navigation data stored in the first storing portion;
an acquiring portion that acquires the second navigation data from the second storage portion; and
an updating portion that updates the first navigation data stored in the first storing portion with the second navigation data by executing a first updating process and a second updating process, wherein
the first updating process stops the execution of a predetermined navigation operation based on the location of the movable body and the first navigation data stored in the first storing portion, and updates a portion of the first navigation data that corresponds to a first area including vicinity of the location of the movable body detected by the movable body location detection portion; and
the second updating process is executed after the first updating process is completed and includes resuming the execution of the navigation operation, and updating a portion of the first navigation data corresponding to a second area different from the first area, the second updating process executed in parallel with the execution of the navigation operation.

* * * * *